United States Patent [19]

Del Monte et al.

[11] Patent Number: 4,959,853
[45] Date of Patent: Sep. 25, 1990

[54] FREQUENCY RESPONSIVE SELECTIVE RINGING CIRCUIT

[76] Inventors: Philip J. Del Monte, 0701 County Rd. 143 A, Florence, Colo. 81226; Jackie L. Vanwey, 24662 Webb Ct., Pueblo, Colo. 81006

[21] Appl. No.: 305,853

[22] Filed: Feb. 2, 1989

[51] Int. Cl.<sup>5</sup> .......................................... H04M 13/00
[52] U.S. Cl. .................................... 379/180; 379/373
[58] Field of Search ............... 379/179, 180, 181, 382, 379/373, 386, 387, 201, 374, 375

[56] References Cited

U.S. PATENT DOCUMENTS

| | | | |
|---|---|---|---|
| 4,224,476 | 9/1980 | Tuhy, Jr. | 379/181 X |
| 4,653,093 | 3/1987 | Zofan | 379/180 X |
| 4,675,899 | 6/1987 | Ahuja | 379/180 |
| 4,701,949 | 10/1987 | Lynch et al. | 379/179 |
| 4,723,271 | 2/1988 | Grundtisch | 379/181 |
| 4,761,810 | 8/1988 | Perry | 379/181 |
| 4,782,518 | 11/1988 | Mattley et al. | 379/201 |

OTHER PUBLICATIONS

"Modern Electronic Devices: Circuit Design and Application", M. Rosenstein et al., Reston Publishing Co., Reston, Va. © 1985, pp. 274–280.

Primary Examiner—Jin F. Ng
Assistant Examiner—Randall S. Vaas
Attorney, Agent, or Firm—John R. Ley

[57] ABSTRACT

A frequency responsive selective ringing circuit detects a selected one of a plurality of frequency-distinctive ringing signals applied on either the tip or ring conductors of a telephone line, distinguishes between the respectively different frequencies on a rapid cycle-by-cycle basis, and either applies the ringing signal to telephone equipment to ring the telephone equipment if the ringing signal is one which is selected, or rectifies the ringing signal and applies the rectified DC signal to the ringing circuit of the telephone equipment. The rectified DC signal will not ring the telephone because the DC signal is not conducted through a capacitor in the ringing circuit of the telephone equipment.

19 Claims, 2 Drawing Sheets

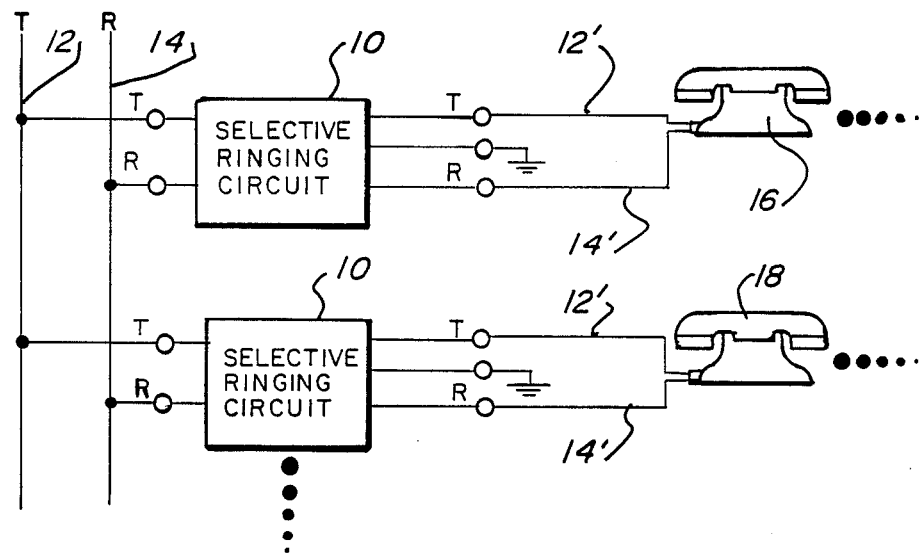
Fig_1
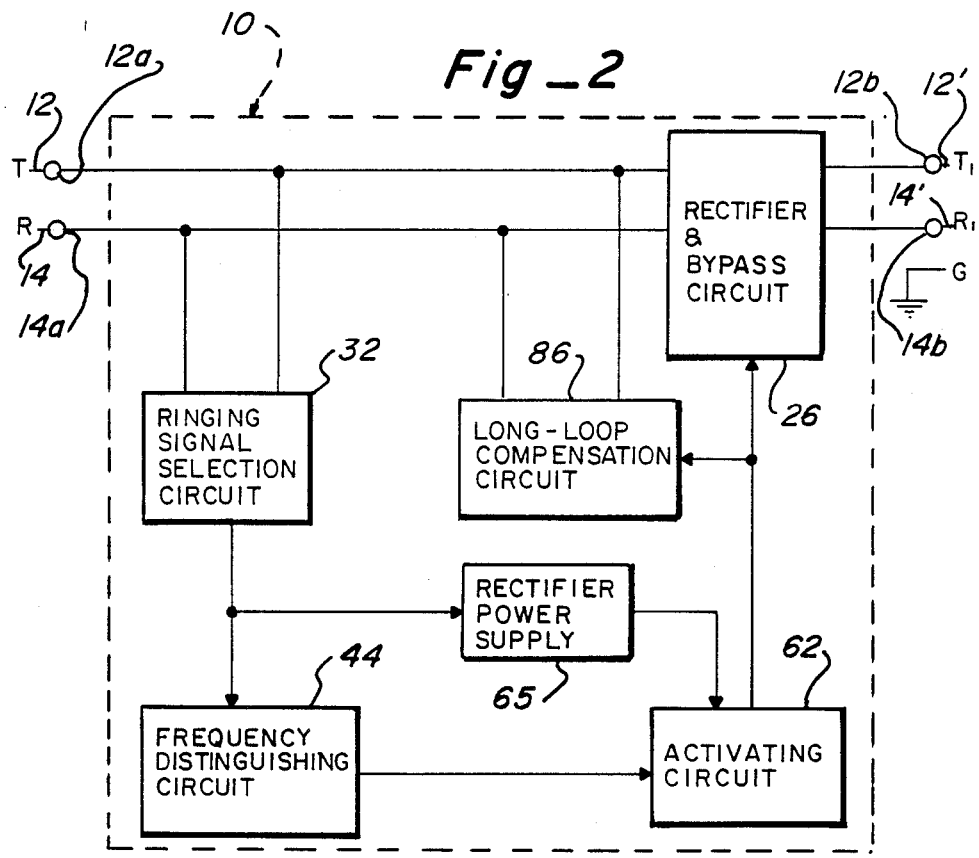
Fig_2

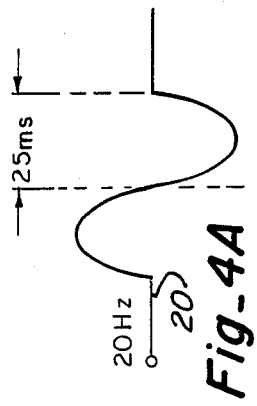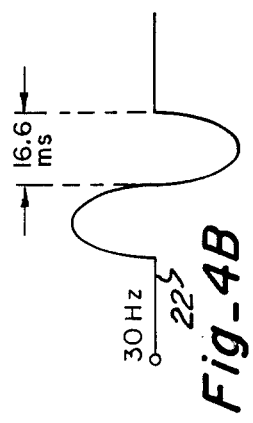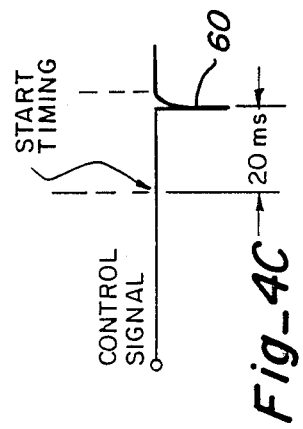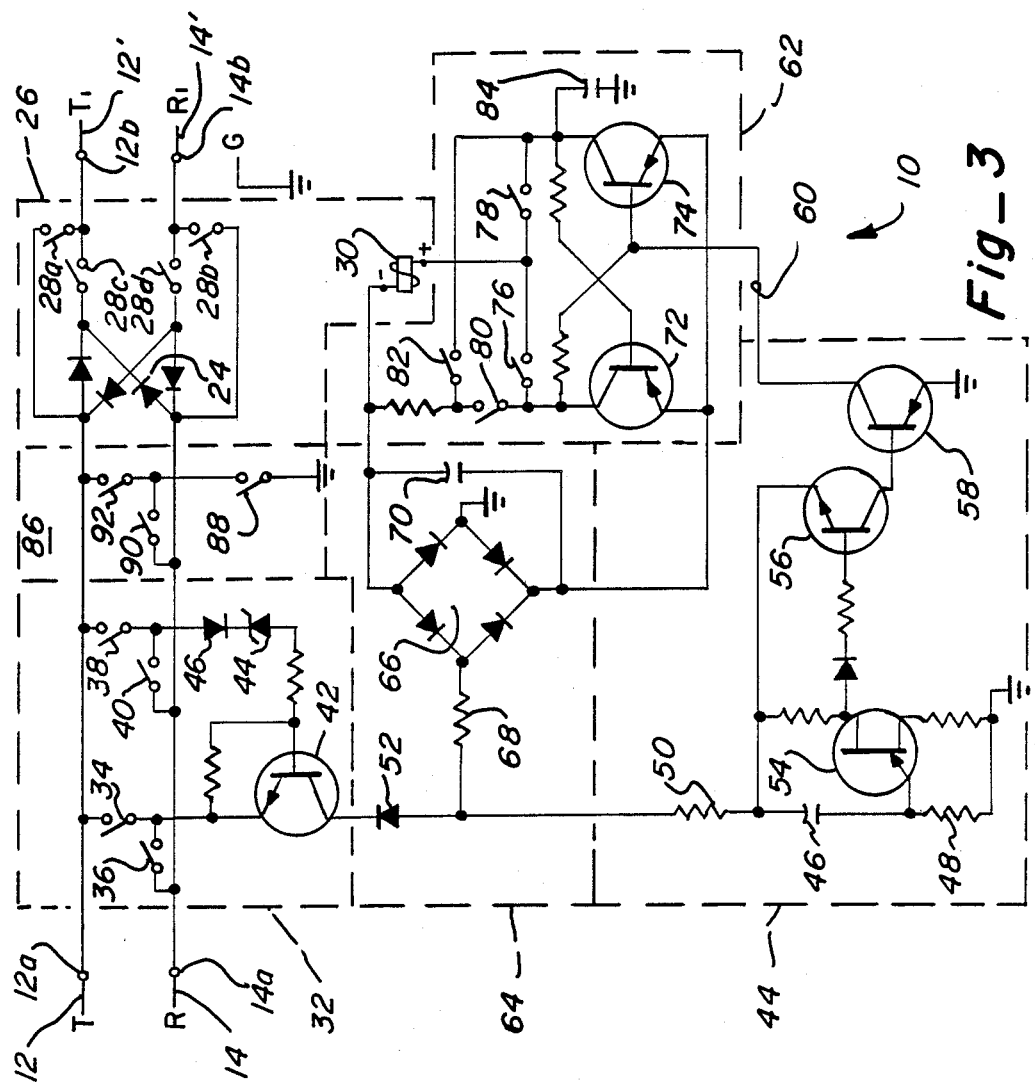

FREQUENCY RESPONSIVE SELECTIVE RINGING CIRCUIT

This invention pertains to a new and improved selective ringing circuit for telephone equipment, which reliably distinguishes between frequency-distinctive ringing signals applied to a telephone party line to ring only the addressed subscriber's equipment while preventing ringing of the other equipment connected to the party line, and which allows conventional telephone equipment to ring in response to the frequency-distinctive ringing signal.

BACKGROUND OF THE INVENTION

The typical subscriber's telephone line is a private line. A private line is a dedicated line from the telephone switching office to the telephone set or equipment in the subscriber's home or office. Access to the line is private since its use is limited to that equipment of the single subscriber. No other party has access to the line. The ringing signal applied to a private line to ring the telephone equipment is typically a constant-frequency polarity-distinctive signal which is offset by a predetermined positive or negative bias voltage from ground. Almost universally, the standard ringing signal applied to a private line is a negative poled 20 Hertz ringing signal applied to the ring conductor of the telephone line.

Party telephone lines are present in some locations, primarily because the number of subscribers within a given geographic area do not justify the added wiring costs of extending individual private lines to each of the consumers. Rural and less populated areas are examples of locations where party lines usually exist. A party line is a single telephone line to which a multiplicity, for example up to four, subscribers are connected. All of the subscribers have access to the line, but only one can use it at a time. The line is not confidential, in that other subscribers can listen in and participate, but usually out of courtesy, do not.

One major consideration regarding a party line is the ability to ring only a specific subscriber by a ringing signal applied over the single party line to which the multiplicity of different telephone sets of different subscribers are connected. One known technique is to allow all the sets of the subscribers to ring, but a different ringing or sounding pattern identifies the subscriber to which the incoming call is addressed. Another more satisfactory approach is that disclosed in U.S. Pat. No. 4,741,024. This patent describes a selective ringing circuit which is connected between the party line and the telephone set, and which responds only to a selected one of a plurality of polarity-distinctive ringing signals applied to the line, to cause only the telephone set of an addressed subscriber to ring in response to the ringing signal. The sets of the other subscribers do not ring in response to the ringing signals except the one addressed to that particular subscriber. Furthermore, the selective ringing circuit described in U.S. Pat. No. 4,471,024 allows conventional telephone equipment designed to be used with private lines to be employed on party lines.

The ringing signal to which the selective ringing circuit of the U.S. Pat. No. 4,741,024 responds is a conventional constant-frequency, polarity-distinctive ringing signal. The selective ringing circuit of the U.S. Pat. No. 4,741,024 patent selectively operates in response to the polarity of the ringing signal on a specific one of the two conductors of the telephone line. The frequency of the signal establishes only the frequency of the audible sound emitted from the ringer of the telephone set, and this frequency is constant, regardless of the polarity of the ringing signal.

Some telephone companies do not distinguish party line ringing signals by voltage polarity. Instead, frequency-distinctive party line ringing signals are employed. For example, 20 and 30 hertz ringing signals may be supplied over either of the conductors of a party line, in order to individually identify and address up to four party line subscribers. The selective ringing circuit described in U.S. Pat. No. 4,741,024 is not frequency responsive, but responds only to the polarity distinctive ringing signals. The selective ringing circuit of the U.S. Pat. No. 4,741,024 patent cannot, therefore, be selectively utilized to achieve comparable advantages in telephone systems using frequency-distinctive ringing signals, as it can be used in those telephone systems utilizing polarity-distinctive ringing signals of constant frequency.

SUMMARY OF THE INVENTION

In accordance with one of its significant features, a frequency responsive selective ringing circuit of the present invention is capable of detecting and responding to a selected one of a plurality of frequency-distinctive ringing signals, in order to ring the telephone set of only the specifically identified subscriber on a party line. The frequency responsive selective ringing circuit of the present invention is further capable of distinguishing between the multiple, different, frequency-distinctive ringing signals on a rapid basis, for example the first cycle of the ringing signal. Further, the frequency responsive selective ringing circuit of the present invention allows conventional telephone equipment to be used without modification on a party line, thereby allowing the party line subscriber to use the commercially available telephone equipment which is primarily intended for private line use.

The frequency responsive selective ringing circuit of the present invention comprises a rectifier and bypass means and a detection and activation means, both of which are connected to the telephone line. The rectifier and bypass means, when not activated, operatively rectifies each of the ringing signals to a DC signal and supplies the DC signal to the telephone equipment. The rectifier and bypass means, when activated, electrically conducts the ringing signal to the telephone equipment. The detection and activation means detects a selected one of the frequency distinctive ringing signals applied to the tip and ring conductors of the telephone line, and activates the rectifier and bypass means in response to the detection of the selected frequency-distinctive ringing signal. The detection and activation means operatively distinguishes among the plurality of frequency-distinctive ringing signals on the basis of their respective frequencies, and preferably on the basis of one cycle of the frequency-distinctive ringing signal. A time width characteristic of one cycle of a frequency-distinctive ringing signal preferably forms the basis by which to distinguish the different frequencies. The time width of the cycle of the selected frequency-distinctive ringing signal is sufficient to charge a timing circuit associated with a unijunction transistor, causing the unijunction to fire and deliver a control signal. Means, preferably a flip-flop, receives the control signal, and sets or resets its state in response to the control signal. The rectifier and bypass means either activates or does not activate in accordance with the set or reset state, as the case may be, so that the ringing signals are either rectified or directly applied to the telephone equipment. Rectified DC signals will not ring the telephone equipment, because a capacitor in the ringing circuit of the equipment becomes charged and blocks the conduction of the ringing signal through the ringing equipment. When the ringing signal is directly connected to the telephone equipment, the oscillating characteristic of the ringing signal causes it to be passed through the capacitor to ring the telephone equipment.

By distinguishing between the multiple different frequency-distinctive ringing signals on the basis of the time width of a cycle of each frequency-distinctive ringing signal, the frequency responsive selective ringing circuit is capable of responding to the first cycle of the ringing signal and thereby rapidly activating or not activating the rectifier and bypass means, as the case may be, in response to a selected ringing signal. By either rectifying the ringing signal or directly applying it to the telephone equipment, conventional telephone equipment can be employed on telephone party lines without modification.

The nature and details of the present invention can be more completely understood by reference to the following description of the preferred embodiment and the accompanying drawings, and from the appended claims.

BRIEF DESCRIPTION OF THE DRAWINGS

FIG. 1 is an illustration of a plurality of frequency responsive selective ringing circuits of the present invention electrically connected between the conductors of a telephone party line and a plurality of telephone sets, each of which is located at the premises of a different subscriber.

FIG. 2 is a block diagram of the components of the frequency responsive selective ringing circuit shown in FIG. 1.

FIG. 3 is a schematic circuit diagram of the components of the frequency responsive selective ringing circuit shown in FIG. 2.

FIGS. 4A, 4B and 4C, respectively, are illustrations of a 20 hertz ringing signal, a 30 hertz ringing signal, and a control signal waveform generated by a detection circuit shown in FIG. 3, all of which have a common time reference point and time axis.

DETAILED DESCRIPTION

A presently preferred embodiment of the frequency responsive selective ringing circuit of the present invention is referenced 10, and is shown in FIG. 1 electrically connected between a telephone party line and a telephone set. The telephone party line comprises a tip conductor 12 and a ring conductor 14. One party or subscriber on the party line has a telephone set 16, and another different party or subscriber on the party line has a different telephone set 18. The subscriber having the telephone set 16 could possess additional telephone sets or additional telephone equipment (not shown) that could be connected in parallel with the telephone set 16 and to the single frequency responsive selective ringing circuit 10. Alternatively, each separate piece of telephone equipment of the first subscriber could employ its own selective ringing circuit 10 which would be directly connected to the telephone party line. A similar situation could exist for the other telephone subscriber having the telephone set 18. For use of the selective ringing circuit 10 on a private line, the telephone equipment of only one party or subscriber would be connected to the telephone line, and separate pieces of telephone equipment would respond to different ringing signals.

The telephone equipment is electrically connected to the selective ringing circuit 10 by tip and ring extension conductors 12' and 14', respectively. Usually, the selective ringing circuit 10 will be located in the subscriber's home or office, in which case the conductors 12' and 14' are simply part of an extension line. However, the selective ringing circuit 10 could also be located in the telephone company central office, in which case the conductors 12' and 14' are dedicated tip and ring connectors extending from the central office to the party line subscriber's telephone equipment in the subscriber's home or office. Although only two party line subscribers are illustrated in FIG. 1, it should be recognized that each subscriber would have at least one selective ringing circuit 10 connecting that subscriber's telephone equipment to the telephone line conductors 12 and 14.

The two typical frequency distinctive ringing signals applied to a telephone party line are a 20 Hz ringing signal 20 and a 30 Hz ringing signal 22, one cycle of each of which is shown in FIGS. 4A and 4B, respectively. The signals 20 and 22 are characteristically sine wave signals, which generally are offset by a negative bias voltage (not shown) from ground potential. Either of the two ringing signals 20 or 22 can be applied to either of the tip or ring conductors, thereby causing four separate ringing signals to be available on a party line. When one of the ringing signals 20 or 22 is applied to one of the conductors 12 or 14, the other conductor is held at ground potential at the central office.

An identical selective ringing circuit 10 is used by all of the party line subscribers. Each circuit 10 responds to a selected predetermined one of the frequency-distinctive ringing signals on a selected one of the tip or ring conductors to ring the telephone equipment, while preventing ringing of the telephone equipment in response to each other, non selected ringing signal.

One frequency responsive selective ringing circuit 10 is shown in greater detail in FIGS. 2 and 3. The tip and ring conductors 12 and 14, respectively, are connected to the selective ringing circuit 10 at terminals 12a and 14a. The tip extension conductor 12' and the ring extension conductor 14' extend from the telephone equipment and connect to the selective ringing circuit 10 at terminals 12b and 14b. In actual practice, conventional telephone jack and socket arrangements are used to provide the terminals 12a and 14a, and the terminals 12b and 14b.

The tip conductor 12 and ring conductor 14 of the telephone party line are electrically connected through the selective ringing circuit 10 to the tip extension conductor 12' and ring extension conductor 14', respectively. In the situation where the subscriber's telephone equipment is not being addressed by the predetermined selected ringing signal and when the telephone equipment is not in use, hereinafter referred to as a "non- or not activated" condition, the electrical connection between the conductors 12 and 12' and the conductors 14 and 14' is through means of a rectifying bridge 24 of a rectifier and bypass circuit 26. The effect of the rectifying bridge 24 is to supply a positive DC voltage on the conductor 12' and a negative DC voltage on conductor 14', regardless of the type or frequency of ringing signal which is applied to the tip and ring conductors 12 and 14, respectively.

The DC signal applied at conductors 12' and 14' has the effect of inhibiting the ringing function of the telephone equipment. The ringing circuit in the telephone equipment is a series connection of a capacitor and an inductor or other device which rings a bell or produces an audible signal only when an AC signal is conducted through it. The DC signal charges the capacitor and prevents it from discharging. The charged capacitor inhibits the current flow through the ringing circuit and therefore prevents the telephone equipment from ringing.

In the situation where the subscriber's telephone equipment is being addressed by the predetermined selected ringing signal, hereinafter referred to as an "activated" condition, a direct electrical connection is established between the conductors 12 and 12' and the conductors 14 and 14'. The rectifying bridge 24 is by-passed in the activated condition, by closed switches 28a and 28b and by opened switches 28c and 28d. The switches 28a, 28b, 28c and 28d are operated as a result of energizing a coil 30 of a relay which includes the contacts or switches 28a, 28b, 28c and 28d. Ringing signals are directly connected through the selective ringing circuit 10 without alteration or modification in the activated condition. The direct electrical connection of the ringing signal to the equipment is an advantage in that it does not adversely affect the normal telephone system operation by, for example, reducing the strength of the ringing signal by adding additional impedance or resistance to the telephone lines In the normal telephone use or communication situation, the rectifying bridge 24 is not bypassed but is in the non-activated condition. A DC current flow path exists through the bridge 24 to the telephone equipment. Since a DC current path exists through the telephone equipment when the equipment is in normal use, the bridge does not affect normal operation in the non-activated condition. A consistent polarity DC signal is applied to the telephone equipment by the bridge 24, and this consistent polarity signal has the effect of maintaining key pads and other devices activated for computer communication purposes and the like.

Unless the selective ringing circuit 10 is activated, it will normally supply a DC voltage and current signal to the telephone equipment connected to conductors 12' and 14'. In response to the application of a selected frequency-distinctive ringing signal on a selected one of the tip and ring conductors 12 and 14, the relay coil 30 will operate the contact switches 28a, 28b, 28c and 28d to the activated position, and the ringing signal will be directly conducted through the selective ringing circuit to the telephone equipment for ringing the equipment in the normal manner Normal ringing occurs in response to a burst or time interval of one of the sine wave ringing signals 20 or 22 (FIGS. 4A or 4B), because the capacitor in the telephone equipment ringing circuit conducts the distinctive-frequency ringing signal and causes the ringer to operate. During the time interval when the burst of consecutive cycles of the frequency-distinctive ringing signals occurs, the relay coil 30 is energized. During the relaxation time interval between bursts, the coil is not energized and the contact switches 28a, 28b, 28c and 28d return to the normal, non-activated positions illustrated in FIG. 3.

The frequency responsive selective ringing circuit 10 includes selection means, preferably in the form of a ringing signal selection circuit 32 (FIGS. 2 and 3), for selecting one of the tip and ring conductors 12 and 14 of the telephone line for detection of a ringing signal As is shown in FIG. 3, the ringing signal selection circuit 32 includes manually operated switches 34, 36, 38 and 40, which when closed in selective pairs, operatively select or monitor either the tip or ring conductor 12 or 14, respectively, for the appearance of a ringing signal. A transistor 42 has its base terminal connected through a Zener diode 44 and a diode 46 to the switches 38 and 40. The transistor 42 conducts only the negative half cycle of each of the ringing signals appearing on the selected one of the tip or ring conductors.

Closure of switches 34 and 40 monitors the presence of the ringing signal on the tip conductor 12. Upon the appearance of the ringing signals on the tip conductor, the transistor 42 conducts the negative half cycles of the ringing signal. The Zener diode 44 commences conducting as soon as the voltage level of the negative half cycles of the ringing signal on the tip conductor drop below a predetermined threshold established by the break-over voltage of the Zener diode 44. Closure of switches 36 and 38 monitors the presence of a ringing signal on the ring conductor 14. The appearance of the ringing signal on the ring conductor 14 results in the transistor 42 conducting the negative half cycles of that ringing signal as soon as the relative voltage between the ring and tip conductors exceeds the break over voltage of the Zener diode 44. The cathode-to-cathode connection of the Zener diode 44 and diode 46 results in the conduction of only the negative pulses of the ringing signal through the transistor 42.

The frequency responsive selective ringing circuit 10 also includes distinguishing means, preferably in the form of a frequency distinguishing circuit 44 (FIGS. 2 and 3), for distinguishing between the frequency-distinctive ringing signals supplied by the ringing signal selection circuit 32 from the monitored tip or ring conductor. Upon distinguishing a selected one of the frequency-distinctive ringing signals, the frequency responsive pulse generator circuit 44 supplies a control signal which ultimately causes the rectifier and bypass circuit 26 to operate in the manner previously described.

The frequency distinguishing circuit 44 is shown in greater detail in FIG. 3. When the transistor 42 conducts the negative half cycle of either frequency-distinctive ringing signal, a capacitor 46 is charged through a resistor 48. The capacitor 46 is also charged through a resistor 50, a diode 52, and the collector emitter resistance of transistor 42, but the resistance of these components is relatively insignificant compared to the resistance of the resistor 48. Accordingly, there is established a timing circuit with a time constant determined primarily by the values of the resistor 48 and capacitor 46. A unijunction transistor 54 has its gate connected to the timing circuit 46 and 48 to form a unijunction relaxation trigger or oscillator circuit. When the voltage across capacitor 46 increases to the predetermined trigger level of the transistor 54 during charging, the transistor 54 fires or conducts a pulse to the amplifying transistors 56 and 58. The transistors 56 and 58 amplify the pulse and supply the control signal 60 shown in FIG. 4C.

The unijunction transistor 54 and the timing circuit 46 and 48 distinguishes between the 20 Hz ringing signal 20 (FIG. 4A) and the 30 Hz ringing signal 22 (FIG. 4B) very rapidly, on a single cycle basis. As can be seen from FIGS. 3, 4A, 4B and 4C, the capacitor 46 will commence charging upon conduction by the transistor 42 during the negative half cycle of either ringing signal 20 or 22. Because the 20 Hz ringing signal 20 has a wider width or longer half cycle time than that of the 30 Hz ringing signal, the capacitor 46 will reach a sufficient charge level to trigger the transistor 54 during the negative half cycle of the 20 Hz signal However, the 30 Hz ringing signal 22 has an insufficient time width during its negative half cycle to charge the capacitor 46 to a sufficient level to trigger the unijunction transistor 54, before the negative half cycle voltage returns to a sufficiently low level that the capacitor 46 can no longer charge. Accordingly, the width of the negative half cycle of the lower frequency ringing signal 20 is sufficient to cause the unijunction transistor 54 to fire, and create, through transistors 56 and 58, the pulse control signal 60 (FIG. 4C).

The pulse control signal 60 from the frequency distinguishing circuit 44 is applied to activation means, preferably in the form of an activating circuit 62 (FIGS. 2 and 3), for controlling and activating the rectifier and bypass circuit 26 in the manner previously described. Electrical power for the activating circuit 62 is supplied by a power supply 64. The power supply 64 derives its power from the ringing signals conducted by the ringing signal detection circuit 32 from the telephone line, thereby avoiding the necessity to rely on electrical power from non telephone sources, such as conventional 60 Hz power.

Details of the activating circuit 62 and the power supply circuit 64 are shown in FIG. 3. The power supply circuit 64 includes a conventional bridge rectifier 66 connected through a resistor 68 and the diode 52 to the collector of transistor 42. When the transistor 42 conducts the negative half cycle of the ringing signal from the selected conductor of the telephone line, the bridge rectifier 66 rectifies the signal and charges capacitor 70. The voltage across capacitor 70 is applied to the activating circuit 62.

The activating circuit 62 includes a conventional flip-flop circuit formed by transistors 72 and 74, and a plurality of manually actuated switches 76, 78, 80 and 82. Depending upon the settings of switches 76, 78, 80 and 82, the relay coil 30 will either be energized or not energized in response to the pulse control signal at 60 from the frequency distinguishing circuit 44. A capacitor 84 is connected to the flip-flop circuit to assure that transistor 74 is on and transistor 72 is off when the activating circuit 62 first receives power from the power supply 64. This initial condition, with transistor 74 conducting, is referred to as the "reset" state. The other condition, with transistor 72 conducting, is referred to as the "set" state.

In order to ring the telephone in response to a 20 Hz signal, switches 76 and 82 are closed. In order to ring the telephone in response to a 30 Hz signal, switches 78 and 80 are closed.

With the closure of switches 78 and 80, the relay coil 30 will be energized only during the reset state. With the closure of switches 76 and 82, the relay coil 30 will be energized only during the set state. The set state is established when a pulse control signal 60 (FIG. 4C) from the frequency distinguishing circuit 44 is delivered to the activating circuit 62. The pulse control signal causes the flip-flop to change states, thereby causing transistor 72 to commence conducting. The flip-flop assumes the set state.

From the foregoing description, it can be seen that the ringing signal detection circuit 32 selects the conductor of the telephone line which is to be monitored for a ringing signal. The frequency distinguishing circuit 44 distinguishes between the two frequency distinctive ringing signals 20 and 22 which appear on the monitored conductor. The two circuits 32 and 44, thus form a means for detecting a selected one of the frequency-distinctive ringing signals applied on a selected one of the tip or the ring conductors. The setting of the switches 76, 78, 80 and 82 allows the presence or absence of the control signal, created respectively by the lower and higher frequency ringing signals, to have the desired effect described above on the rectifier and bypass circuit 26. Thus by setting the switches 76, 78, 80 and 82, the activating circuit 62 responds to either the presence or absence of the pulse control signal created by the lower or higher frequency ringing signal, respectively. The three circuits 32, 44 and 62 are the preferred form of detecting and activating means for detecting a selected one of the frequency distinctive ringing signals applied to one of the tip or ring conductors of the telephone line, and activating the rectifier and bypass circuit 26 in response to the detection of the selected ringing signal on the selected conductor.

After the passage of each burst of the ringing signal, the flip-flop of the activating circuit 62 returns to the reset condition as a result of the discharge of the capacitor 70 of the power supply circuit 64 and the recharging of the capacitor 84 with the next subsequent burst of ringing signal.

A long loop compensation circuit 86 (FIG. 2) is also included in the frequency responsive selective ringing circuit 10. The details of the long loop compensation circuit 86 are shown in FIG. 3. The long loop compensation circuit 86 operates in response to the activation of relay coil 30. When the relay coil 30 is energized, the contact switch 88 is closed. One of the other two switches 90 and 92 of the circuit 86 is selectively manually closed depending upon the settings of switches 34, 36, 38 and 40 which identify the one conductor, tip or ring, to which the application of a ringing signal causes the selective ringing circuit 10 to respond. For example, if the circuit 10 is to respond to ringing signals applied to the ring conductor 14, switch 92 is closed. The presence of the selected frequency distinctive ringing signal on the ringing conductor causes the relay coil 30 to become energized, thereby connecting the tip conductor to ground through the closed switches 92 and 88. By grounding the tip conductor in this manner at the circuit 10, the resistance of the tip conductor from the location of the selective ringing circuit 10 back to the telephone company central switching office is eliminated, thereby eliminating the resistance of the tip conductor in the circuit and increasing the strength of the ringing signal on the ring conductor 14. A comparable effect occurs by closing switch 90 in response to selecting the frequency distinctive ringing signal from the tip conductor. In that case, the ring conductor is grounded to increase the strength of the ringing signal on the tip conductor, when the relay coil 30 is energized.

A presently preferred embodiment of the present invention has been described above with a degree of specificity. The invention itself, however, is defined by the scope of the following appended claims.

What is claimed is:

1. A frequency responsive selective ringing circuit for ringing telephone equipment connected to a telephone line upon receipt of a predetermined one of plurality of frequency-distinctive AC ringing signals which have potentials on the telephone line that alternate at predetermined different frequencies and for preventing ringing of the telephone equipment upon receipt of any other frequency-distinctive ringing signals, the telephone equipment ringing only in response to a ringing signal conducted therethrough, said selective ringing circuit comprising in combination:

rectifier and bypass means connected to the telephone line and operative for rectifying each of the ringing signals to a DC signal when not activated and for supplying the DC signal to the telephone equipment, and operative for electrically conducting the ringing signal to the telephone equipment when activated; and detection and activation means connected to the telephone line and to the rectifier and bypass means, and operative in response to the potential of the AC ringing signals for detecting a selected one of the frequency-distinctive AC ringing signals on the basis of one cycle of the AC ringing signal applied to the telephone line and for activating the rectifier and bypass means in response to the detection of the selected ringing signal.

2. A frequency responsive selective ringing circuit as defined in claim 1 wherein said detection and activation means further comprises:

distinguishing means for operatively distinguishing among the plurality of frequency-distinctive ringing signals on the basis of their respectively different frequencies.

3. A frequency responsive selective ringing circuit as defined in claim 2 wherein said distinguishing means further comprises:

means which is operatively triggered by a predetermined characteristic of one AC cycle of one of the plurality of frequency-distinctive ringing signals and which is not triggered by a characteristic of one AC cycle of the other ones of the plurality of frequency-distinctive ringing signals.

4. A frequency responsive selective ringing circuit as defined in claim 3 wherein the predetermined characteristic is a half of the AC cycle of the frequency-distinctive ringing signals.

5. A frequency responsive selective ringing circuit as defined in claim 4 wherein the predetermined characteristic is the time width of the half AC cycle of the frequency-distinctive ringing signal.

6. A frequency responsive selective ringing circuit as defined in claim 3 wherein said means operatively triggered by a predetermined characteristic of one AC cycle comprises:

a unijunction transistor, and
a timing circuit operatively connected to the unijunction transistor.

7. A frequency responsive selective ringing circuit as defined in claim 6 wherein:

the predetermined characteristic is a half of the AC cycle of the one of the frequency-distinctive ringing signals; and the timing circuit has a time constant which results in firing of the unijunction transistor upon the time width of the half cycle exceeding a predetermined value.

8. A frequency responsive selective ringing circuit as defined in claim 7, wherein:

two different frequency-distinctive ringing signals are applied to the telephone line; and the unijunction transistor fires in response to the half cycle of the one frequency-distinctive ringing signal having the greater time width than the half cycle of the other frequency-distinctive ringing signal.

9. A frequency responsive selective ringing circuit as defined in claim 1 wherein the telephone line includes a ring conductor and a tip conductor, and wherein said detection and activation means further comprises:

selection means connected to the tip and ring conductors and operative for supplying a ringing signal on the selected one of the tip or ring conductor.

10. A frequency responsive selective ringing circuit as defined in claim 9, wherein said selection means comprises:

manually activated switch means connected to the tip and ring conductors and operative when manually activated to supply the ringing signals applied to a selected one of the tip and ring conductors.

11. A frequency responsive selective ringing circuit as defined in claim 10 wherein said selection means further comprises:

half cycle conduction means connected to said switch means and responsive to the ringing signals on the selected conductor for conducting only half of an AC cycle of each ringing signal supplied by said switch means.

12. A frequency responsive selective ringing circuit as defined in claim 11 wherein said detection and activation means further comprises:

distinguishing means connected to said selected means and receptive of each half cycle of each ringing signal conducted by said half cycle conduction means, said distinguishing means operatively distinguishing between the ringing signals on the basis of a predetermined characteristic of the half cycle of the ringing signal conducted by the half cycle conduction means, said distinguishing means further supplying a control signal upon distinguishing a selected one of the frequency distinctive ringing signals.

13. A frequency responsive selective ringing circuit as defined in claim 12 wherein said activation and detection means further comprises:

activating means responsive to the presence and absence of the control signal for activating and not activating the rectifier and bypass means.

14. A frequency responsive selective ringing circuit as defined in claim 12 wherein said distinguishing means further comprises:

timing means receptive of the half cycle of the ringing signal conducted by said half cycle conduction means and operative for developing an output level signal related to the characteristic time width of the half cycle of the ringing signal conducted by said half cycle conduction means;

a unijunction transistor connected to the timing means and receptive of the output level signal and operative in response to the output level signal exceeding a predetermined trigger threshold level to fire into conduction and create the control signal; and wherein:

the characteristic time width of only one of the half cycles of the plurality of frequency-distinctive ringing signals is sufficient to develop a sufficient output level signal from said timing means to fire said unijunction transistor.

15. A frequency responsive selective ringing circuit as defined in claim 14 wherein said activation and deactivation means further comprises:
set and reset means connected to said distinguishing means and said rectifier and bypass means and operative for establishing set and reset states in response to the control signal from said distinguishing means, said set and reset means supplying an activating signal to said rectifier and bypass means, said activating signal being either the presence or absence of activating energy to either activate or not activate said rectifier and bypass means, respectively.

16. A frequency responsive selective ringing circuit as defined in claim 15 wherein said set and reset establishing means comprises:
a flip-flop circuit.

17. A frequency responsive selective ringing circuit as defined in claim 15 wherein said set and reset establishing means comprises:
a relay which is selectively energized or de-energized in response to the control signal.

18. A frequency responsive selective ringing circuit as defined in claim 15 further comprising:
power supply means operatively connected to said selection and distinguishing means and operative in response to the half cycle of the ringing signal conducted by said selection means to develop power for energizing the set and reset means; and wherein:
said set and reset means establishing one state in which either the activating signal is supplied or not supplied; and
the control signal supplied to said set and reset means is operative to change the state of said set and reset means from that previously established.

19. A frequency responsive selective ringing circuit for ringing telephone equipment connected to a telephone line upon receipt of a predetermined one of plurality of frequency-distinctive AC ringing signals which have potentials on the telephone line that alternate at predetermined different frequencies and for preventing ringing of the telephone equipment upon receipt of any other frequency-distinctive ringing signals, the telephone equipment ringing only in response to a ringing signal conducted therethrough, the telephone line having a tip conductor and a ring conductor, said selective ringing circuit comprising in combination:
rectifier and bypass means connected to the tip and ring conductors and operative for rectifying the ringing signals on the conductors to a DC signal when not activated and for supplying the DC signal to the telephone equipment, and operative for electrically conducting the ringing signal to the telephone equipment when activated;
manually activated switch means connected to the tip and ring conductors and operative when manually activated to supply the ringing signals applied to a selected one of the tip and ring conductors;
half cycle conduction means connected to said switch means and responsive to the ringing signals on the selected conductor for conducting only a half of an AC cycle of each AC ringing signal supplied by said switch means;
timing means receptive of, and operative in response to the potential of, the half cycle of the ringing signal conducted by said half cycle conduction means for developing an output level signal related to the time width of the half cycle of the ringing signal conducted by said half cycle conduction means;
mean connected to the timing means and receptive of the output level signal and operative in response to the output level signal exceeding a predetermined trigger threshold level for creating the control signal, the time width of only one of the half cycles of the plurality of frequency-distinctive ringing signals being sufficient to develop a sufficient output level signal from said timing means to create the control signal;
set and reset means connected to said control signal creating means and said rectifier and bypass means and operative for establishing set and reset states in response to the control signal, said set and reset means supplying an activating signal to said rectifier and bypass means, said activating signal being either the presence or absence of activating energy to either activate or not activate said rectifier and bypass means, respectively;
power supply means operatively connected to said selection and distinguishing means and operative in response to the half cycle of the ringing signal conducted by said selection means to develop power for energizing the set and reset means; and wherein:
said set and reset means establishing one state in which either the activating signal is supplied or not supplied; and
the control signal supplied to said set and reset means is operative to change the state of said set and reset means from that previously established.

* * * * *